US012613762B1

(12) United States Patent
Zhao et al.

(10) Patent No.: US 12,613,762 B1
(45) Date of Patent: Apr. 28, 2026

(54) HOT SWAP ERROR REPORTING METHOD, PROCESSOR ARCHITECTURE, DEVICE AND STORAGE MEDIUM

(71) Applicant: SUZHOU METABRAIN INTELLIGENT TECHNOLOGY CO., LTD., Suzhou (CN)

(72) Inventors: Tianyu Zhao, Suzhou (CN); Xiuqiang Sun, Suzhou (CN); Guozhi Han, Suzhou (CN); Peiyu Liu, Suzhou (CN); Chuang Chen, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/142,130

(22) PCT Filed: Apr. 24, 2024

(86) PCT No.: PCT/CN2024/089641

§ 371 (c)(1),
(2) Date: Jun. 20, 2025

(87) PCT Pub. No.: WO2025/123553

PCT Pub. Date: Jun. 19, 2025

(30) Foreign Application Priority Data

Dec. 12, 2023 (CN) .......................... 202311704052.2

(51) Int. Cl.
*G06F 11/07* (2006.01)
(52) U.S. Cl.
CPC ...... *G06F 11/0781* (2013.01); *G06F 11/0745* (2013.01); *G06F 11/0772* (2013.01);
(Continued)

(58) Field of Classification Search
CPC ............. G06F 11/0745; G06F 11/0772; G06F 11/0775; G06F 11/0778; G06F 11/0781;
(Continued)

(56) References Cited

U.S. PATENT DOCUMENTS 10,776,193 B1 * 9/2020 Karpagavinayagam .....................
G06F 11/0793
2006/0282595 A1 * 12/2006 Upton ................. G06F 11/0745
710/302

(Continued)

FOREIGN PATENT DOCUMENTS

CN          109885521 A      6/2019
CN          113342592 A      9/2021
(Continued)

*Primary Examiner* — Marc Duncan
*Assistant Examiner* — Albert Li
(74) *Attorney, Agent, or Firm* — IPro, PLLC

(57) ABSTRACT

A method for reporting a hot-swap error, a processor architecture, a device, and a storage medium are provided by an embodiment of the present application. The method is applied to an advanced reduced instruction-set computer (RISC) machine (ARM) platform, the ARM platform includes a baseboard management controller (BMC), an operating system (OS), and a basic input output system (BIOS). Data transmission between the BMC and the OS is performed based on a data interface service configured via the BIOS. During operation of the ARM platform, in response to a system control processor (SCP) in the BIOS detecting a PCIe CE type reporting error information corresponding to any interface, the SCP transmits the PCIe CE type reporting error information to the BMC and the OS.

20 Claims, 2 Drawing Sheets

During operation of the ARM platform, in response to an SCP in the BIOS detecting PCIe CE type reporting error information corresponding to any interface, transmitting, by the SCP, the PCIe CE type reporting error information to the BMC and the OS ⟶ S101

Triggering, by the OS, the BMC to collect device data ⟶ S102

Determining, by the OS, whether the PCIe CE type reporting error information corresponding to the interface is hot-swap reporting error information based on the device data collected by the BMC, a reporting error status of the PCIe CE type reporting error information corresponding to the interface, and hot-swap reporting error parameters that are preset ⟶ S103

In response to the PCIe CE type reporting error information being the hot-swap reporting error information, transmitting, by the OS, blocking information corresponding to the hot-swap reporting error information to the BMC ⟶ S104

(52) U.S. Cl.
CPC ...... *G06F 11/0775* (2013.01); *G06F 11/0778*
(2013.01); *G06F 11/0784* (2013.01); *G06F*
*11/079* (2013.01)

(58) Field of Classification Search
CPC . G06F 11/0784; G06F 11/079; G06F 11/1417
See application file for complete search history.

(56) References Cited

U.S. PATENT DOCUMENTS

| | | | |
|---|---|---|---|
| 2008/0005620 A1* | 1/2008 | Walker ................ | G06F 11/0745 |
| | | | 714/43 |
| 2024/0054040 A1* | 2/2024 | Yu ........................ | G06F 11/0772 |
| 2025/0147833 A1* | 5/2025 | Li ........................... | G06F 11/30 |

FOREIGN PATENT DOCUMENTS

| | | | |
|---|---|---|---|
| CN | 114201360 A | 3/2022 |
| CN | 115033409 A | 9/2022 |
| CN | 115237656 A | 10/2022 |
| CN | 115391081 A | 11/2022 |
| CN | 116954986 A | 10/2023 |
| CN | 117389819 A | 1/2024 |

* cited by examiner

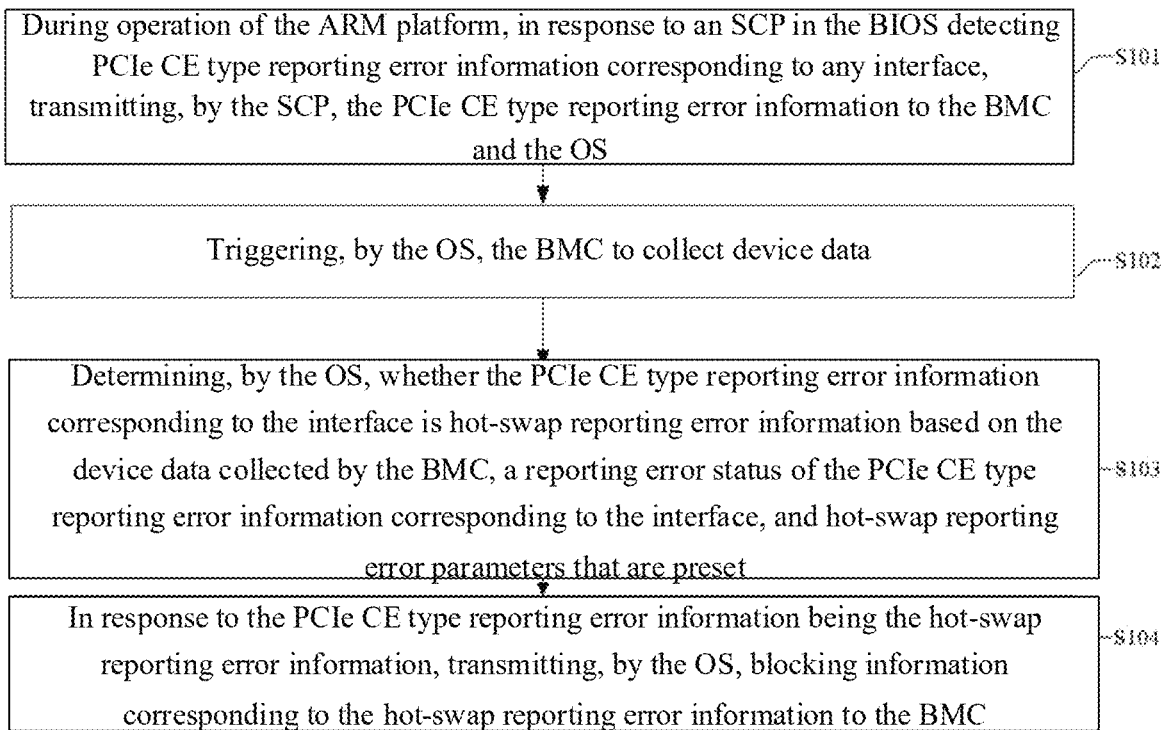

During operation of the ARM platform, in response to an SCP in the BIOS detecting PCIe CE type reporting error information corresponding to any interface, transmitting, by the SCP, the PCIe CE type reporting error information to the BMC and the OS ⌐S101

Triggering, by the OS, the BMC to collect device data ⌐S102

Determining, by the OS, whether the PCIe CE type reporting error information corresponding to the interface is hot-swap reporting error information based on the device data collected by the BMC, a reporting error status of the PCIe CE type reporting error information corresponding to the interface, and hot-swap reporting error parameters that are preset ⌐S103

In response to the PCIe CE type reporting error information being the hot-swap reporting error information, transmitting, by the OS, blocking information corresponding to the hot-swap reporting error information to the BMC ⌐S104

FIG. 1

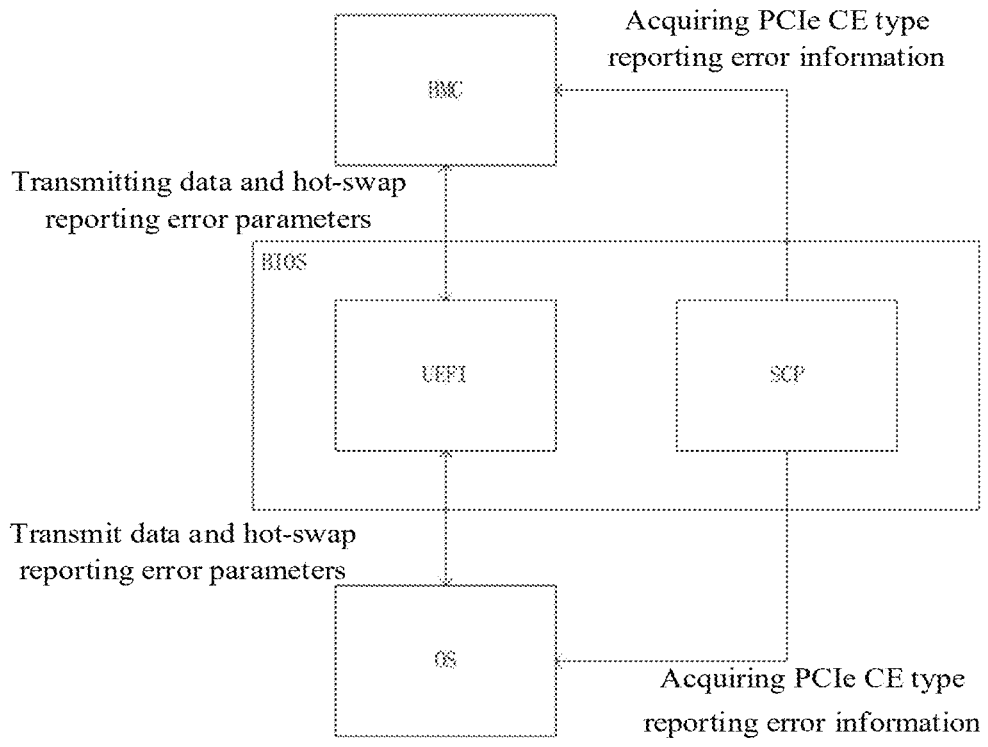

Acquiring PCIe CE type reporting error information

BMC

Transmitting data and hot-swap reporting error parameters

BIOS

UEFI          SCP

Transmit data and hot-swap reporting error parameters

OS

Acquiring PCIe CE type reporting error information

FIG. 2

HOT SWAP ERROR REPORTING METHOD, PROCESSOR ARCHITECTURE, DEVICE AND STORAGE MEDIUM

CROSS-REFERENCE TO RELATED APPLICATION

This application claims the priority of the Chinese Patent application filed on Dec. 12, 2023 before the China National Intellectual Property Administration with the application number of 202311704052.2, and the title of "HOT SWAP ERROR REPORTING METHOD, PROCESSOR ARCHITECTURE, DEVICE AND STORAGE MEDIUM", which is incorporated herein in its entirety by reference.

FIELD

Embodiments of the present application relate to the technical field of data processing, and, more particularly, to a method for reporting a hot-swap error, a processor architecture, a device, and a storage medium.

BACKGROUND

At present, a processor firmware of an advanced reduced instruction-set computer (RISC) machine (ARM, a processor architecture) platform is primarily divided into two parts: a system control processor (SCP) and a unified extensible firmware interface (UEFI). Due to the design by the major hardware vendors, Reliability, Availability, and Serviceability (RAS, which are indexes for evaluating system performance functions) functions may be completed within the SCP component. As a result, due to constraints by hardware component vendors and the ARM platform, it is difficult to perform customized modifications to achieve the main functionalities of RAS.

Within the RAS functionality of the ARM platform, a handling mechanism for peripheral component interconnect express correctable errors (PCIe CE) is relatively inadequate. In particular, a common hot-swap function is not separately designed or distinguished. That is, the ARM platform provides an overall control management solution for the PCIe CE, which may only perform overall regulation of the PCIe CE reporting error as a whole. However, the PCIe CE reporting error includes not only a hot-swap type reporting error but also other types of reporting error information. Therefore, the current ARM platform is constrained by the limitations of its hardware components, making it difficult to block reporting errors such as hot-swap to misreport unnecessary information such as hot-swap reporting error information, while the stability of use and the overall assessment of the server are affected, the stability experience of users during use is significantly reduced, resulting in unnecessary warranties and disputes.

SUMMARY

A method for reporting a hot-swap error, a processor architecture, a device, and a storage medium are provided by embodiments of the present application, aiming to improve the user experience during use.

In a first aspect, a method for reporting a hot-swap error is provided by the embodiments of the present application, the method is applied to an advanced reduced instruction-set computer (RISC) machine (ARM) platform, the ARM platform includes a baseboard management controller (BMC), an operating system (OS), and a basic input output system (BIOS); data transmission between the BMC and the OS is performed based on a data interface service configured via the BIOS; and the method includes:

during operation of the ARM platform, in response to a system control processor (SCP) in the BIOS detecting peripheral component interconnect express correctable error (PCIe CE) type reporting error information corresponding to any interface, transmitting, by the SCP, the PCIe CE type reporting error information to the BMC and the OS;

triggering, by the OS, the BMC to collect device data;

determining, by the OS, whether the PCIe CE type reporting error information corresponding to the interface is hot-swap reporting error information based on the device data collected by the BMC, a reporting error status of the PCIe CE type reporting error information corresponding to the interface, and hot-swap reporting error parameters that are preset; and in response to the PCIe CE type reporting error information being the hot-swap reporting error information, transmitting, by the OS, blocking information corresponding to the hot-swap reporting error information to the BMC.

In some embodiments, after the in response to the PCIe CE type reporting error information being the hot-swap reporting error information, transmitting, by the OS, the blocking information corresponding to the hot-swap reporting error information to the BMC, the method further includes:

in response to the blocking information corresponding to the hot-swap reporting error information, deleting, by the BMC, the hot-swap reporting error information.

In some embodiments, the method further includes:

collecting, by the BMC, the device data at preset intervals and transmitting the collected device data to the OS.

In some embodiments, the hot-swap reporting error parameters include a hot-swap reporting error interval, and the determining, by the OS, whether the PCIe CE type reporting error information corresponding to the interface is the hot-swap reporting error information based on the device data collected by the BMC, the reporting error status of the PCIe CE type reporting error information corresponding to the interface, and the hot-swap reporting error parameters that are preset includes:

for the PCIe CE type reporting error information corresponding to the interface, determining, by the OS, a reporting error duration between first reporting error time of the PCIe CE type reporting error information and last reporting error time of the PCIe CE type reporting error information; and in response to the reporting error duration being less than the hot-swap reporting error interval and the OS, based on the device data collected by the BMC, determining that device change information exists on the interface within the reporting error duration, determining the PCIe CE type reporting error information corresponding to the interface as the hot-swap reporting error information, wherein the device change information includes device addition or device removal.

In some embodiments, the hot-swap reporting error parameters include a hot-swap reporting error threshold, and the determining, by the OS, whether the PCIe CE type reporting error information corresponding to the interface is the hot-swap reporting error information based on the device data collected by the BMC, the reporting error status of the PCIe CE type reporting error information corresponding to the interface, and the hot-swap reporting error parameters that are preset includes:

for the PCIe CE type reporting error information corresponding to the interface, counting, by the OS, a quantity of reporting error times of the PCIe CE type reporting error information within a designated time period; and in response to the quantity of reporting error times of the PCIe CE type reporting error information within the designated time period being less than the hot-swap reporting error threshold, and the OS, based on the device data collected by the BMC, determining that device change information exists on the interface within the designated time period, determining the PCIe CE type reporting error information corresponding to the interface as the hot-swap reporting error information, wherein the device change information includes device addition or device removal.

In some embodiments, the method further includes:

during startup of the ARM platform, registering, by the BIOS of the ARM platform, a data interface service on the OS and the BMC, wherein the data interface service is configured for providing a data transmission interface between the BMC and the OS via the BIOS.

In some embodiments, the during the startup of the ARM platform, registering, by the BIOS of the ARM platform, the data interface service on the OS and the BMC includes:

after a server of the ARM platform is powered on, registering, by the BIOS, a data interface service on the BMC;

after entering the OS, running a first hot-swap reporting error management program in the OS, and accessing, by the first hot-swap reporting error management program, the data interface service registered by the BIOS;

transmitting, by the OS, activation information to the BMC through the data transmission interface provided by the data interface service; and in response to the activation information, starting, by the BMC, a second hot-swap reporting error management program stored in the BMC.

In some embodiments, after the server of the ARM platform is powered on, the method further includes:

transmitting, by the BIOS, hot-swap reporting error parameters currently stored by the BIOS to the BMC.

In some embodiments, after the after entering the OS, running the first hot-swap reporting error management program in the OS, the method further includes:

accessing and acquiring, by the first hot-swap reporting error management program, hot-swap reporting error parameters currently stored by the BIOS from the BIOS.

In some embodiments, the method further includes:

after a server of the ARM platform is powered on, detecting, by the BMC, whether the BMC stores hot-swap reporting error parameters obtained from the BIOS;

transmitting, by the BIOS, hot-swap reporting error parameters currently stored by the BIOS to the BMC and registering a data interface service, wherein the data interface service is configured for providing a data transmission interface between the BMC and the OS via the BIOS;

after entering the OS, running a first hot-swap reporting error management program in the OS, accessing, by the first hot-swap reporting error management program, the data interface service registered by the BIOS and acquiring the hot-swap reporting error parameters currently stored by the BIOS from the BIOS;

transmitting, by the OS, activation information to the BMC through the data transmission interface provided by the data interface service; and in response to the activation information, starting, by the BMC, a second hot-swap reporting error management program stored in the BMC.

In some embodiments, before entering the OS, the method further includes:

monitoring, by the BIOS in real time, a modification operation for the hot-swap reporting error parameters; and in response to a modification operation for the hot-swap reporting error parameters being detected, transmitting, by the BIOS, modified hot-swap reporting error parameters to the OS and the BMC, respectively.

In some embodiments, before entering the OS, the method further includes:

in response to a disable operation for a hot-swap reporting error setting option, transmitting, by the BIOS, hot-swap reporting disable information to the OS and the BMC, respectively;

in response to the hot-swap reporting disable information, stopping, by the OS, execution of the first hot-swap reporting error management program; and in response to the hot-swap reporting disable information, stopping, by the BMC, execution of the second hot-swap reporting error management program.

In some embodiments, the method further includes:

during operation of the ARM platform, in response to a modification operation for hot-swap reporting error parameters, storing, by the OS, modified hot-swap reporting error parameters and transmitting the modified hot-swap reporting error parameters to the BIOS and the BMC, respectively.

In some embodiments, during a next startup of the ARM platform, the method further includes:

after a server of the ARM platform is powered on, transmitting, by the BIOS, modified hot-swap reporting error parameters stored by the BIOS to the BMC and the OS, respectively.

In some embodiments, the method further includes:

in response to an upgrade operation for a management program, acquiring, by the OS, a to-be-upgraded first hot-swap reporting error management program, and upgrading a current first hot-swap reporting error management program to the to-be-upgraded first hot-swap reporting error management program.

In some embodiments, after the determining, by the OS, whether the PCIe CE type reporting error information corresponding to the interface is the hot-swap reporting error information based on the device data collected by the BMC, the reporting error status of the PCIe CE type reporting error information corresponding to the interface, and the hot-swap reporting error parameters that are preset, the method further includes:

in response to the PCIe CE type reporting error information being not the hot-swap reporting error information, transmitting, by the OS, a normal processing information corresponding to the PCIe CE type reporting error information to the BMC; and in response to the normal processing information corresponding to the PCIe CE type reporting error information, recording and reporting, by the BMC, the PCIe CE type reporting error information.

In some embodiments, in response to the PCIe CE type reporting error information being the hot-swap reporting error information, the method further includes:

storing, by the OS, the PCIe CE type reporting error information and a timestamp of the PCIe CE type reporting error information in a hot-swap summary list, to facilitate summarizing and viewing all hot-swap reporting error information.

In some embodiments, the method further includes:

in response to a query operation for a hot-swap reporting error, generating, by the OS, a visualized hot-swap reporting error chart based on the hot-swap summary list for displaying.

In a second aspect, a processor architecture is provided by embodiments of the present application, wherein the processor architecture includes the BMC, the OS, and the BIOS, and the processor architecture is configured to perform the method for reporting the hot-swap reporting error of the first aspect.

In a third aspect, a computing device is provided by embodiments of the present application, which includes at least one processor and a memory, the memory stores a computer program capable of executing on the at least one processor, wherein the computer program, in response to being executed by the at least one processor, causes the at least one processor to perform the method for reporting the hot-swap error of the first aspect.

In a fourth aspect, a non-transitory readable storage medium is provided by embodiments of the present application, which has a computer program stored therein, wherein the computer program, in response to being executed by a processor, causes the processor to perform the method for reporting the hot-swap error of the first aspect.

during operation of the ARM platform, in response to a system control processor (SCP) in the BIOS detecting a peripheral component interconnect express correctable error (PCIe CE) error on any interface, transmitting, by the SCP, the PCIe CE type reporting error information to both the BMC and the OS;

triggering, by the OS, the BMC to collect device data;

determining, by the OS, whether the PCIe CE type reporting error information corresponding to the interface is a hot-swap reporting error information based on the device data collected by the BMC, a status of the PCIe CE type reporting error information corresponding to the interface, and preset hot-swap reporting error parameters; and in response to the PCIe CE type reporting error information being the hot-swap reporting error information, transmitting, by the OS, a blocking information for the hot-swap reporting error information to the BMC.

Beneficial Effects

During operation of the ARM platform, when the SCP in the BIOS detects the PCIe CE type reporting error information corresponding to any interface, the SCP transmits the PCIe CE type reporting error information to both the BMC and the OS; the OS triggers the BMC to collect the device data; the OS determines whether the PCIe CE type reporting error information corresponding to any interface is the hot-swap reporting error information based on the device data collected by the BMC, the reporting error status of the PCIe CE type reporting error information corresponding to any interface, and the hot-swap reporting error parameters that are preset; and in response to the PCIe CE type reporting error information being the hot-swap reporting error information, the OS transmits the blocking information corresponding to the hot-swap reporting error information to the BMC.

The method for reporting the hot-swap error provided by the present embodiment is not subject to the constraints by device vendors or an architecture of the ARM platform. Data interface service configured between the BMC and the OS for performing data transmission breaks a data transmission barrier between the OS and the BMC. The OS determines whether the PCIe CE type reporting error information is the hot-swap reporting error information, and in response to the PCIe CE type reporting error information being the hot-swap reporting error information, the OS transmits the blocking information corresponding to the hot-swap reporting error information to the BMC, thus the hot-swap reporting error information is blocked, unnecessary hot-swap reporting errors are prevented from being presented to users, user experience during use is significantly improved.

BRIEF DESCRIPTION OF THE DRAWINGS

In order to more clearly describe some embodiments of the present application or technical solutions in the related art, a brief introduction to the drawings required to be used for the description of the embodiments or the related art is provided below.

FIG. 1 shows a flowchart of steps of a method for reporting a hot-swap error according to some embodiments of the present application;

FIG. 2 shows a structural topology diagram of an advanced reduced instruction-set computer (RISC) machine (ARM) platform according to some embodiments of the present application;

DETAILED DESCRIPTION

Figure 3:
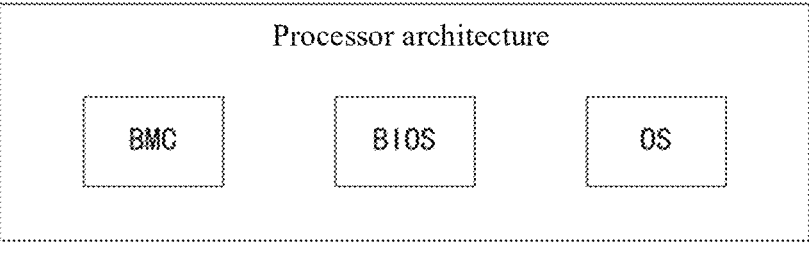
FIG. 3 shows a schematic diagram of a processor architecture according to some embodiments of the present application.

The technical solutions in some embodiments of the present application will be described below with reference to the drawings in some embodiments of the present application.

For making objectives, technical solutions, and advantages of some embodiments of the present application clearer, the implementations will further be described below with reference to the drawings in detail. However, a person skilled in the art will appreciate that various technical details are included in the implementations of the present application to facilitate a better understanding of the present application. It should be noted that the technical solutions required to be protected herein may be implemented even in the absence of these technical details and various changes and modifications based on the following implementations. The division of the following embodiments is for descriptive convenience and shall not constitute any limitation to the specific implementation of the present application. The embodiments may be combined with or referenced by each other without contradiction.

ARM: Advanced RISC Machine, a processor architecture;

CPU: Central Processing Unit;

BMC: Baseboard Management Controller;

OS: Operating System; the common OS in servers is Linux system;

BIOS: Basic Input Output System, generally referring to UEFI;

UEFI: Unified Extensible Firmware Interface;

SCP: system control processor;

RAS: Reliability, Availability, and Serviceability, an index used to evaluate system performance, including reliability, availability, and serviceability. In this context, it primarily refers to the Machine Check Architecture (MCA) mechanism, which is used to detect hardware errors; and PCIe CE: peripheral component interconnect express correctable errors, i.e., memory correctable errors.

Hot swapping refers to insertion or removal of modules or cards into/from a system without shutting down a system power, without affecting the normal operation of the system. This enhances system reliability, rapid repairability, redundancy, and the ability to recover promptly in the event of disasters.

In the related art, the ARM platform provides only a total control management solution for PCIe CE in response to the hot-swap reporting error, that is, in current ARM platforms, the PCIe CE type reporting error includes not only a hot-swap type reporting error, but also other types of reporting error information, making it impossible to achieve independent management for the hot-swap type reporting error. Hot swapping is a high-performance requirement, the reporting error of the hot swapping is unnecessary information. The hot-swap reporting error is classified in the PCIe CE type reporting error information leads to a need for specialized technical personnel to determine and filter out false reporting information of the hot swapping during troubleshooting. Moreover, false reporting may generate corresponding reporting error logs in the BMC, which reduces system stability. Meanwhile, the need for professional personnel to distinguish the reporting errors increases maintenance difficulty, maintenance costs and production costs. Thus, the stability of use and the overall assessment of the server may be affected, the stability experience of users during use is significantly reduced, resulting in unnecessary warranties and disputes.

In view of this, a method for reporting a hot-swap error is provided by some embodiments of the present application, independent management of the hot-swap reporting error may be performed to reduce unnecessary reporting error, thereby the user experience during use is improved.

Referring to FIG. 1, which shows a flowchart of steps of a method for reporting a hot-swap error according to some embodiments of the present application. The method is applied to an ARM platform. The ARM platform includes a BMC, an OS, and a BIOS. In the present embodiment, data transmission between the BMC and the OS is performed based on a data interface service configured via the BIOS to break a data transmission barrier between the OS and the BMC. The method may include the following steps:

S101, During operation of the ARM platform, in response to an SCP in the BIOS detecting PCIe CE type reporting error information corresponding to any interface, transmitting, by the SCP, the PCIe CE type reporting error information to the BMC and the OS.

In the ARM platform, the BMC incudes software that operates on independent hardware and starts running from the moment a server is powered on. As soon as the server is connected to a power source, the BMC software may start running promptly. The OS and BIOS are programs executed by a CPU of the ARM platform, wherein the BIOS may be divided into an SCP and a UEFI. The SCP is a program that runs on a dedicated micro-core within the CPU and is configured to monitor the PCIe CE type reporting error information. When a device, such as a hard disk, is triggered for removal, an end point of the server reports the PCIe CE type reporting error information to a root point. The SCP controls the root point and has the function of filtering the PCIe CE type reporting error information. When reporting the PCIe CE type reporting error information, the SCP sets a register within the CPU. The BMC may obtain the PCIe CE type reporting error information by reading a register status. Simultaneously, the CPU may transmit the PCIe CE type reporting error information to the OS via an advanced configuration and power management interface (ACPI). Each PCIe CE type reporting error information includes information about an interface on which the error occurred, thus the interface reporting the PCIe CE type reporting error information may be found out.

In the present application, during operation of the ARM platform, when the SCP detects PCIe CE type reporting error information corresponding to any interface, the PCIe CE type reporting error information may be hot-swap reporting error information. Therefore, further determination of the PCIe CE type reporting error information is required. However, since the SCP is low-level firmware on the ARM platform and control policies enforced by the SCP are predefined by CPU vendors and cannot be easily modified. In order to separate hot-swap reporting error information from PCIe CE type reporting error information, in the present embodiment, the PCIe CE type reporting error information detected by the SCP is simultaneously transmitted to the BMC and the OS.

S102, triggering, by the OS, the BMC to collect device data.

In the present embodiment, in the ARM platform, data transmission between the OS and the BMC may be implemented to break a data transmission barrier between the OS and the BMC.

In some feasible implementations, during startup of the ARM platform, a BIOS of the ARM platform registers a data interface service on the OS and the BMC, and the data interface service is configured for providing a data transmission interface between the BMC and the OS via the BIOS.

A first hot-swap reporting error management program may be preconfigured in the OS, and a second hot-swap reporting error management program may be preconfigured in the BMC. Hot-swap reporting error setting options may be preconfigured in the BIOS, through the hot-swap reporting error setting options, a user may independently choose whether to perform a process of blocking hot-swap reporting error, and is allowed to define hot-swap reporting error parameters.

After the server of the ARM platform is powered on, the BIOS registers the data interface service on the BMC, and transmits hot-swap reporting error parameters currently stored by the BIOS to the BMC.

After entering the OS, the first hot-swap reporting error management program runs in the OS, accesses the data interface service registered by the BIOS, accesses and acquires the currently stored hot-swap reporting error parameters from the BIOS; the OS transmits activation information to the BMC through the data transmission interface provided by the data interface service; and in response to the activation information, the BMC starts the second hot-swap reporting error management program stored in the BMC, and at this moment, data transmission between the OS and the BMC may be performed.

Subsequently, after the OS receives the PCIe CE type reporting error information transmitted by the SCP, the BMC is triggered to collect the device data. In response to a trigger operation, BMC starts collecting the device data. In other implementations, the BMC may also collect the device data at preset intervals and transmit the collected device data to the OS.

Since the BMC has a data collection channel that is independent of the BIOS and is specially supported by hardware, for example, the BMC may directly access information of PCIe devices on the server via an inter-integrated circuit (I2C) bus, such as reading information from a hard disk. Thus, an actual online status of the devices may be acquired, then the collected device data is packaged, and the packaged device data is transmitted to the OS through the data interface service registered by the BIOS.

S103, Determining, by the OS, whether the PCIe CE type reporting error information corresponding to the interface is hot-swap reporting error information based on the device data collected by the BMC, a reporting error status of the PCIe CE type reporting error information corresponding to the interface, and hot-swap reporting error parameters that are preset.

Hot-swap reporting error information may be reported as PCIe CE type reporting error information not only when a device is removed, but also during device insertion due to contact issues such as installation vibrations. However, once the hot-swap operation is completed, such hot-swap reporting error will no longer be reported. Accordingly, hot-swap reporting error parameters may be configured, and based on the device data collected by the BMC, the OS may determine whether the PCIe CE type reporting error information corresponding to any interface is the hot-swap reporting error information. The hot-swap reporting error parameters may include a hot-swap reporting error interval or a hot-swap reporting error threshold. The hot-swap reporting error interval refers to a time interval between different time of the PCIe CE type reporting error information corresponding to any interface. The hot-swap reporting error threshold refers to a threshold for a quantity of reporting error times of the PCIe CE type reporting error information corresponding to any interface.

In some feasible implementations, the PCIe CE type reporting error information may be determined to be the hot-swap reporting error information or not based on the hot-swap reporting error interval.

For the PCIe CE type reporting error information corresponding to any interface, the OS determines a reporting error duration between first reporting error time and last reporting error time of the PCIe CE type reporting error information; and in response to the reporting error duration being less than the hot-swap reporting error interval and the OS, based on the device data collected by the BMC, determines that device change information exists on the interface within the reporting error duration, the OS determines the PCIe CE type reporting error information corresponding to the interface as the hot-swap reporting error information.

During a hot-swap operation for any device, a hot-swap action is completed within a short time, for example, the hot-swap action is completed within 1 second. During this 1-second period, an interface performing the hot-swap operation reports the PCIe CE type reporting error information. However, if the OS determines that the PCIe CE type reporting error information corresponding to any interface continues to be reported after 1 second, it indicates that the PCIe CE type reporting error information is not caused by the hot-swap action and continuous reporting of the PCIe CE type reporting error information may be caused by a poor contact between the device and the interface or other issues.

Moreover, hot-swap actions necessarily lead to device addition or removal on the interface. Therefore, when determining whether the PCIe CE type reporting error information is the hot-swap reporting error information, it is also necessary to determine whether the device change information exists on the interface within the reporting error duration based on the device data collected by the BMC. The device change information includes device addition or device removal. It is possible that a device remains physically connected to the interface, but a PCIe circuit between the device and the interface is disconnected. Such a condition does not constitute a reporting error caused by a hot-swap operation. Therefore, the BMC also needs to acquire the device change information via the I2C bus to exclude the condition where the device is still connected but the PCIe circuit is disconnected.

The hot-swap reporting error interval in the present implementation may be customized according to actual application requirements, and is not limited herein.

In some feasible implementations, the PCIe CE type reporting error information may also be determined to be the hot-swap reporting error information or not based on the hot-swap reporting error threshold.

For the PCIe CE type reporting error information corresponding to any interface, the OS counts the quantity of reporting error times of the PCIe CE type reporting error information within a designated time period. In response to the quantity of reporting error times of the PCIe CE type reporting error information within the designated time period being less than the hot-swap reporting error threshold and the OS determines, based on the device data collected by the BMC, that the device change information exists on the interface within the designated time period, i.e., device addition or device removal, the PCIe CE type reporting error information corresponding to the interface is determined as the hot-swap reporting error information.

Since a reporting error frequency is generally fixed at the time of leaving factory, the quantity of reporting error times of the PCIe CE type reporting error information within the designated time period may be counted to determine whether the quantity of reporting error times within the designated time period is less than the hot-swap reporting error threshold. For example, the hot-swap reporting error threshold may be set to 5. If, within one second, the quantity of reporting error times of the PCIe CE type reporting error information corresponding to any interface is less than 5, it indicates that the hot-swap operation has been completed within that one second and no further errors are reported. If the quantity of reporting error times is greater than or equal to 5, it indicates that the reporting errors are not caused by the hot-swap operation, and thus the PCIe CE type reporting error information is not the hot-swap reporting error information.

The hot-swap reporting error threshold and a length of the designated time period in the present embodiment may be customized according to actual application requirements, and are not limited herein.

S104, in response to the PCIe CE type reporting error information being the hot-swap reporting error information, transmitting, by the OS, blocking information corresponding to the hot-swap reporting error information to the BMC.

In response to the blocking information corresponding to the hot-swap reporting error information, the hot-swap reporting error information corresponding to the interface may be deleted.

In response to the PCIe CE type reporting error information being not the hot-swap reporting error information, the OS may allow normal reporting of the PCIe CE type reporting error information.

In some feasible implementations, in response to the PCIe CE type reporting error information being not the hot-swap reporting error information, the OS may further transmit a normal processing information corresponding to the PCIe CE type reporting error information to the BMC. In response to the normal processing information corresponding to the PCIe CE type reporting error information, the BMC records and reports the PCIe CE type reporting error information.

Although the hot-swap reporting error information is not reported, the OS may store the PCIe CE type reporting error information and a timestamp of the PCIe CE type reporting error information in a hot-swap summary list to facilitate summarizing and viewing all hot-swap reporting error information. Maintenance personnel may perform query operations on the OS to view the hot-swap reporting error information when needed. In response to the query operation for the hot-swap reporting error, the OS generates a visualized hot-swap reporting error chart based on the hot-swap summary list for displaying.

The present embodiment integrates respective functions of the BIOS, the BMC, and the OS on the ARM platform to achieve a function that cannot be achieved by a single component alone, namely, enabling independent management of the hot-swap type reporting error, which cannot be achieved by standalone components on the ARM platform.

Referring to FIG. 2, which is a structural topology diagram of an ARM platform according to some embodiments of the present application. Although a UEFI portion of a BIOS cannot directly manage a PCIe CE type reporting error, the UEFI portion serves as a primary user part, hot-swap reporting error setting options and hot-swap reporting error parameters may be preconfigured in the BIOS via the UEFI, allowing users to manage a determination process of a hot-swap reporting error by employing common operation methods. The BIOS may transmit the hot-swap reporting error setting options and the hot-swap reporting error parameters to the BMC and the OS, respectively. In the BIOS, the SCP is configured to acquire the PCIe CE type reporting error information and transmit the PCIe CE type reporting error information to the BMC and the OS. The OS and the BMC may perform data interactions through the data interface service of the BIOS.

As a primary user interaction channel, the OS is the system that users interact with most easily during normal business operations. Due to the characteristic of the OS, main interactive components of a process are placed at the OS side. The hot-swap reporting error setting options and the hot-swap reporting error parameters provided by the BIOS, along with device data collected by the BMC, are summarized to the OS. The OS determines whether the PCIe CE type reporting error information is the hot-swap reporting error information, and then feeds back a determination result to the BMC via the data interface service, and informs the BMC side that the PCIe CE type reporting error information is the hot-swap type reporting error information rather than a conventional PCIe CE reporting error. The BMC deletes the hot-swap type reporting error information to avoid false reporting error information in the BMC. Meanwhile, the OS may summarize the hot-swap type reporting error information, allowing users to conveniently view error information occurring during ongoing hot-swap operations and assisting engineers in confirming information during debugging.

Furthermore, since the primary determination of the hot-swap reporting error information is performed at the OS side, the first hot-swap reporting error management program on the OS may be timely updated and upgraded based on the characteristics of the ease of updating of the OS, thus it is not necessary to rely on firmware updates. In response to an upgrade operation of the management program, the OS acquires a to-be-upgraded first hot-swap reporting error management program, and upgrades a current first hot-swap reporting error management program to the to-be-upgraded first hot-swap reporting error management program.

At the same time, as the primary user interaction channel, the OS may also directly update or adjust the hot-swap reporting error parameters, and then synchronize the updated or adjusted hot-swap reporting error parameters to the BIOS and BMC. For example, during operation of the ARM platform, the OS, in response to a modification operation for the hot-swap reporting error parameters, stores the modified hot-swap reporting error parameters and transmits the modified hot-swap reporting error parameters to the BIOS and the BMC, respectively. After the hot-swap reporting error parameters updated or adjusted at the OS side are synchronized to the BIOS, in the next startup process of the ARM platform, when a server of the ARM platform is powered on, the BIOS still transmits the hot-swap reporting error parameters modified by the user through the OS to the BMC and the OS. This ensures that the user may configure the hot-swap reporting error parameters through the BIOS and the OS.

In some feasible implementations, after the server of the ARM platform is powered on, the BMC detects whether it stores the hot-swap reporting error parameters obtained from the BIOS and waits for the registration of the data interface service of the BIOS. The BIOS then transmits the hot-swap reporting error parameters currently stored by the BIOS to the BMC and registers the data interface service. The BIOS monitors modification operations for the hot-swap reporting error parameters in real time. When a modification operation for the hot-swap reporting error parameters occurs, the BIOS transmits the modified hot-swap reporting error parameters to the BMC.

After entering the OS, the first hot-swap reporting error management program in the OS runs, accesses the data interface service registered by the BIOS, and acquires the modified hot-swap reporting error parameters from the BIOS.

The OS transmits activation information to the BMC via the data transmission interface provided by the data interface service. In response to the activation information, BMC starts the second hot-swap reporting error management program stored in the BMC.

In some feasible implementations, before entering the OS, in response to a disable operation for the hot-swap reporting error setting options, the BIOS transmits the hot-swap reporting disable information to the OS and the BMC, respectively. The OS, in response to the hot-swap reporting disable information, stops execution of the first hot-swap reporting error management program. The BMC, in response to the hot-swap reporting disable information, stops execution of the second hot-swap reporting error management program, thereby the determination process of the hot-swap reporting error information may stop.

According to the method for reporting the hot-swap error provided by the present embodiment, data transmission between the OS and the BMC is implemented via the data interface service configured between the BMC and the OS, thereby a data transmission barrier between the OS and the BMC is broken, and then the OS determines whether the PCIe CE type reporting error information is the hot-swap reporting error information, and in response to the PCIe CE type reporting error information being the hot-swap reporting error information, transmits the blocking information corresponding to the hot-swap reporting error information to the BMC, thereby the hot-swap reporting error information may be blocked. In this way, unnecessary hot-swap reporting errors are prevented from being presented to users, thereby significantly improving the user experience during use. Moreover, the method offers strong scalability, portability, and operability, making it suitable for different hardware platform types. The method is not limited to the individual management of hot-swap reporting error information, but may also be applied in the management of other types of reporting error information.

Referring to FIG. 3, which is a schematic diagram of a processor architecture according to some embodiments of the present application. The processor architecture includes a BMC, an OS, and a BIOS, and is configured to perform the method for reporting the hot-swap error according to some embodiments.

Figure 4:
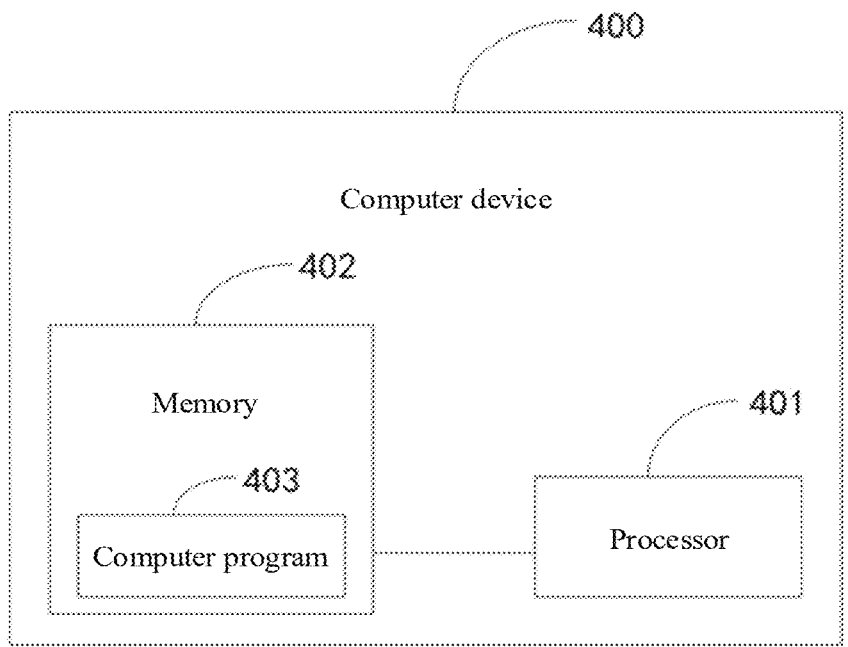
FIG. 4 shows a schematic diagram of a computer device according to some embodiments of the present application.

Referring to FIG. 4, which is a schematic diagram of a computer device according to some embodiments of the present application. The computer device 400 includes: at least one processor 401 and a memory 402. The memory 402 stores a computer program 403 capable of executing on the at least one processor 401. The computer program 403, in response to being executed by the at least one processor 401, causes the at least one processor 401 to perform the method for reporting the hot-swap error according to some embodiments.

Figure 5:
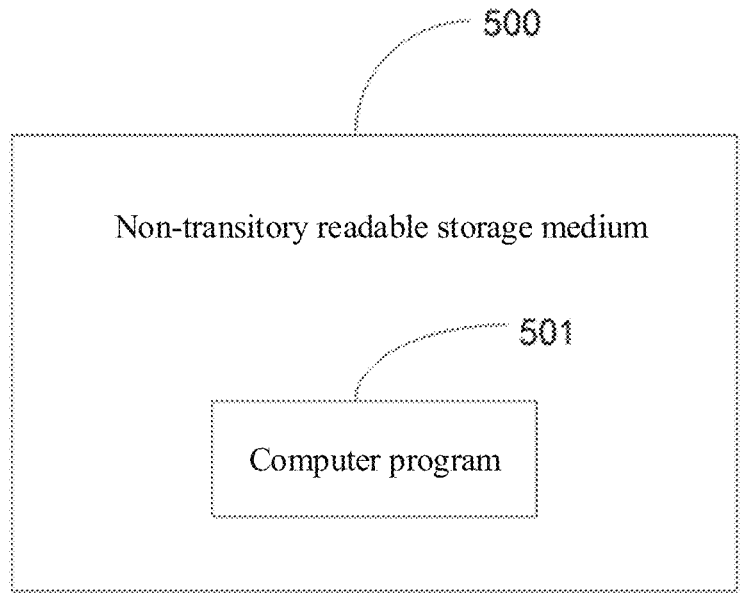
FIG. 5 shows a schematic diagram of a non-transitory readable storage medium according to some embodiments of the present application.

Referring to FIG. 5, which is a schematic diagram of a non-transitory readable storage medium according to some embodiments of the present application. The non-transitory readable storage medium 500 stores a computer program 501. The computer program 501, in response to being executed by a processor, causes the processor to perform the method for reporting the hot-swap error according to some embodiments.

In this specification, various embodiments are described in a progressive manner, each of which focuses on a difference from the other embodiments, and reference should be made to the same or similar parts throughout the various embodiments.

A person skilled in the art should understand that the embodiments of the present application may provide a method, a system, or a computer program product. Therefore, the present application may use the form of complete hardware embodiments, complete software embodiments, or software and hardware combination embodiments. In addition, the embodiments of the present application may use the form of a computer program product implemented on one or more computer-readable storage media (including, but not limited to, a magnetic disk memory, a compact disc read-only memory (CD-ROM), an optical memory, etc.) including computer-executable program codes.

The embodiments of the present application are described by referring to the flowcharts or block diagrams of methods, terminal devices (systems), and computer program products according to the embodiments of the present application. It should be understood that computer program instructions may implement each flow and/or each block in the flowcharts and/or the block diagrams, and combination of the flows and/or the blocks in the flowcharts and/or the block diagrams. These computer program instructions may be provided for a general computer, a dedicated computer, an embedded processor or processors of other programmable data processing terminal devices to generate a machine, thereby making the instructions that are executed by the computer or the processors of other programmable data processing terminal devices generate apparatuses for achieving specified functions in one or more flows of the flowcharts and/or one or more blocks of the block diagrams.

These computer program instructions also may be stored in a computer non-transitory readable memory capable of guiding the computer or other programmable data processing terminal devices to work in a specific manner, thereby making the instructions that are stored in the computer non-transitory readable memory generate manufactured products that include instruction apparatuses. The instruction apparatuses achieve the specified functions in one or more flows of the flowcharts or one or more blocks of the block diagrams.

These computer program instructions also may be loaded onto the computer or other programmable data processing terminal devices to execute a series of operation steps on the computer or other programmable data processing terminal devices to generate computer implemented processing, so that the instructions executed on the computer or other programmable data processing terminal devices provide steps for achieving the specified functions in one or more flows of the flowcharts and/or one or more blocks of the block diagrams.

Although the embodiments of the present application have been described, a person skilled in the art, upon learning the fundamental inventive concept, may make additional changes and modifications to these embodiments. Accordingly, the appended claims are intended to be construed as encompassing the embodiments as well as all changes and modifications that fall within the scope of the present application.

Finally, it is noted that relational terms such as first and second, and the like, may be used solely to distinguish one entity or operation from another entity or operation without necessarily requiring or implying any actual such relationship or order between such entities or actions. Furthermore, the terms "include", "include", or any other variation thereof, are intended to cover a non-exclusive inclusion, such that a process, method, article, or terminal device that includes a list of elements does not include only those elements but may include other elements not expressly listed or inherent to such process, method, article, or apparatus. An element proceeded by "includes a . . . " does not, without more constraints, preclude the existence of additional identical elements in the process, method, article, or terminal device that includes the element.

The principle and implementations of the present application are elaborated with specific examples in the present application, and the descriptions made to the embodiments are only adopted to help the method of the present application and the core concept thereof to be understood. In addition, those of ordinary skill in the art may make variations to the specific implementations and the application scope according to the concept of the present application. In conclusion, the contents of the specification should not be understood as limits to the present application.

The invention claimed is:

1. A method for reporting a hot-swap reporting error, wherein the method is applied to an advanced reduced instruction-set computer (RISC) machine (ARM) platform, the ARM platform comprises a baseboard management controller (BMC), an operating system (OS), and a basic input output system (BIOS); data transmission between the BMC and the OS is performed based on a data interface service configured via the BIOS; and the method comprises:

during operation of the ARM platform, in response to a system control processor (SCP) in the BIOS detecting peripheral component interconnect express correctable error (PCIe CE) type reporting error information corresponding to any interface, transmitting, by the SCP, the PCIe CE type reporting error information to the BMC and the OS;

triggering, by the OS, the BMC to collect device data;

determining, by the OS, whether the PCIe CE type reporting error information corresponding to the interface is hot-swap reporting error information based on the device data collected by the BMC, a reporting error status of the PCIe CE type reporting error information corresponding to the interface, and hot-swap reporting error parameters that are preset; and in response to the PCIe CE type reporting error information being the hot-swap reporting error information, transmitting, by the OS, blocking information corresponding to the hot-swap reporting error information to the BMC.

2. The method according to claim 1, wherein after the in response to the PCIe CE type reporting error information being the hot-swap reporting error information, transmitting, by the OS, the blocking information corresponding to the hot-swap reporting error information to the BMC, the method further comprises:

in response to the blocking information corresponding to the hot-swap reporting error information, deleting, by the BMC, the hot-swap reporting error information.

3. The method according to claim 1, wherein the method further comprises:

collecting, by the BMC, the device data at preset intervals and transmitting the collected device data to the OS.

4. The method according to claim 1, wherein the hot-swap reporting error parameters comprise a hot-swap reporting error interval, and the determining, by the OS, whether the PCIe CE type reporting error information corresponding to the interface is the hot-swap reporting error information based on the device data collected by the BMC, the reporting error status of the PCIe CE type reporting error information corresponding to the interface, and the hot-swap reporting error parameters that are preset comprises:

for the PCIe CE type reporting error information corresponding to the interface, determining, by the OS, a reporting error duration between first reporting error time of the PCIe CE type reporting error information and last reporting error time of the PCIe CE type reporting error information; and in response to the reporting error duration being less than the hot-swap reporting error interval and the OS, based on the device data collected by the BMC, determining that device change information exists on the interface within the reporting error duration, determining the PCIe CE type reporting error information corresponding to the interface as the hot-swap reporting error information, wherein the device change information comprises device addition or device removal.

5. The method according to claim 1, wherein the hot-swap reporting error parameters comprise a hot-swap reporting error threshold, and the determining, by the OS, whether the PCIe CE type reporting error information corresponding to the interface is the hot-swap reporting error information based on the device data collected by the BMC, the reporting error status of the PCIe CE type reporting error information corresponding to the interface, and the hot-swap reporting error parameters that are preset comprises:

for the PCIe CE type reporting error information corresponding to the interface, counting, by the OS, a quantity of reporting error times of the PCIe CE type reporting error information within a designated time period; and in response to the quantity of reporting error times of the PCIe CE type reporting error information within the designated time period being less than the hot-swap reporting error threshold, and the OS, based on the device data collected by the BMC, determining that device change information exists on the interface within the designated time period, determining the PCIe CE type reporting error information corresponding to the interface as the hot-swap reporting error information, wherein the device change information comprises device addition or device removal.

6. The method according to claim 1, wherein the method further comprises: during startup of the ARM platform, registering, by the BIOS of the ARM platform, the data interface service on the OS and the BMC, wherein the data interface service is configured for providing a data transmission interface between the BMC and the OS via the BIOS.

7. The method according to claim 6, wherein the during the startup of the ARM platform, registering, by the BIOS of the ARM platform, the data interface service on the OS and the BMC comprises:

after a server of the ARM platform is powered on, registering, by the BIOS, the data interface service on the BMC;

after entering the OS, running a first hot-swap reporting error management program in the OS, and accessing, by the first hot-swap reporting error management program, the data interface service registered by the BIOS;

transmitting, by the OS, activation information to the BMC through the data transmission interface provided by the data interface service; and in response to the activation information, starting, by the BMC, a second hot-swap reporting error management program stored in the BMC.

8. The method according to claim 7, wherein after the server of the ARM platform is powered on, the method further comprises:

transmitting, by the BIOS, hot-swap reporting error parameters currently stored by the BIOS to the BMC.

9. The method according to claim 7, wherein after the after entering the OS, running the first hot-swap reporting error management program in the OS, the method further comprises:

accessing and acquiring, by the first hot-swap reporting error management program, hot-swap reporting error parameters currently stored by the BIOS from the BIOS.

10. The method according to claim 1, wherein the method further comprises:

after a server of the ARM platform is powered on, detecting, by the BMC, whether the BMC stores hot-swap reporting error parameters obtained from the BIOS;

transmitting, by the BIOS, hot-swap reporting error parameters currently stored by the BIOS to the BMC and registering the data interface service, wherein the data interface service is configured for providing a data transmission interface between the BMC and the OS via the BIOS;

after entering the OS, running a first hot-swap reporting error management program in the OS, accessing, by the first hot-swap reporting error management program, the data interface service registered by the BIOS and acquiring the hot-swap reporting error parameters currently stored by the BIOS from the BIOS;

transmitting, by the OS, activation information to the BMC through the data transmission interface provided by the data interface service; and in response to the activation information, starting, by the BMC, a second hot-swap reporting error management program stored in the BMC.

11. The method according to claim 10, wherein before entering the OS, the method further comprises:

monitoring, by the BIOS in real time, a modification operation for the hot-swap reporting error parameters; and in response to a modification operation for the hot-swap reporting error parameters being detected, transmitting, by the BIOS, modified hot-swap reporting error parameters to the OS and the BMC, respectively.

12. The method according to claim 7, wherein before entering the OS, the method further comprises:

in response to a disable operation for a hot-swap reporting error setting option, transmitting, by the BIOS, hot-swap reporting disable information to the OS and the BMC, respectively;

in response to the hot-swap reporting disable information, stopping, by the OS, execution of the first hot-swap reporting error management program; and in response to the hot-swap reporting disable information, stopping, by the BMC, execution of the second hot-swap reporting error management program.

13. The method according to claim 1, wherein the method further comprises:

during operation of the ARM platform, in response to a modification operation for hot-swap reporting error parameters, storing, by the OS, modified hot-swap reporting error parameters and transmitting the modified hot-swap reporting error parameters to the BIOS and the BMC, respectively.

14. The method according to claim 13, wherein during a next startup of the ARM platform, the method further comprises:

after a server of the ARM platform is powered on, transmitting, by the BIOS, modified hot-swap reporting error parameters stored by the BIOS to the BMC and the OS, respectively.

15. The method according to claim 12, wherein the method further comprises:

in response to an upgrade operation for a management program, acquiring, by the OS, a to-be-upgraded first hot-swap reporting error management program, and upgrading a current first hot-swap reporting error management program to the to-be-upgraded first hot-swap reporting error management program.

16. The method according to claim 1, wherein after the determining, by the OS, whether the PCIe CE type reporting error information corresponding to the interface is the hot-swap reporting error information based on the device data collected by the BMC, the reporting error status of the PCIe CE type reporting error information corresponding to the interface, and the hot-swap reporting error parameters that are preset, the method further comprises:

in response to the PCIe CE type reporting error information being not the hot-swap reporting error information, transmitting, by the OS, a normal processing information corresponding to the PCIe CE type reporting error information to the BMC; and in response to the normal processing information corresponding to the PCIe CE type reporting error information, recording and reporting, by the BMC, the PCIe CE type reporting error information.

17. The method according to claim 1, wherein in response to the PCIe CE type reporting error information being the hot-swap reporting error information, the method further comprises:

storing, by the OS, the PCIe CE type reporting error information and a timestamp of the PCIe CE type reporting error information in a hot-swap summary list to facilitate summarizing and viewing all hot-swap reporting error information.

18. A processor architecture, wherein the processor architecture comprises the BMC, the OS, and the BIOS, and the processor architecture is configured to perform the method for reporting the hot-swap reporting error according to claim 1.

19. A computing device, comprising at least one processor and a memory, the memory storing a computer program capable of executing on the at least one processor, wherein the computer program, in response to being executed by the at least one processor, causes the at least one processor to perform the method for reporting the hot-swap error according to claim 1.

20. A non-transitory computer readable storage medium, having a computer program stored therein, wherein the computer program, in response to being executed by a processor, causes the processor to perform the method for reporting the hot-swap error according to claim 1.

\* \* \* \* \*